July 9, 1940. A. W. GAUBATZ 2,207,376
VIBRATION SUPPRESSOR
Filed Sept. 12, 1938
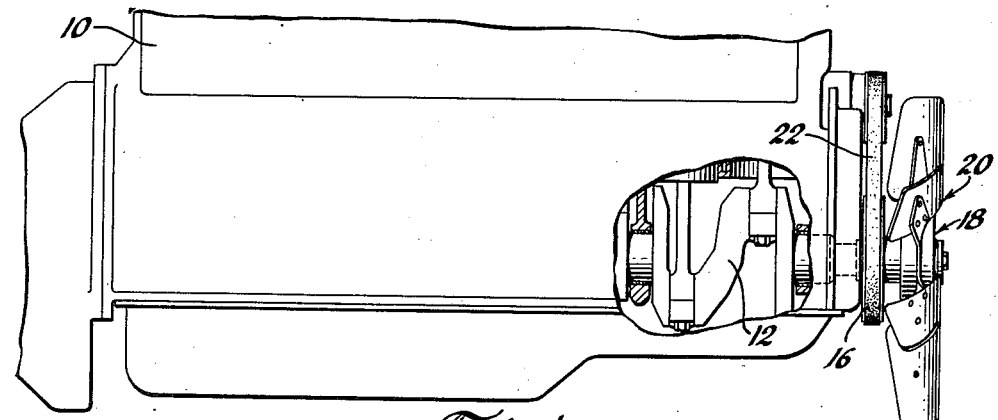
Fig. 1
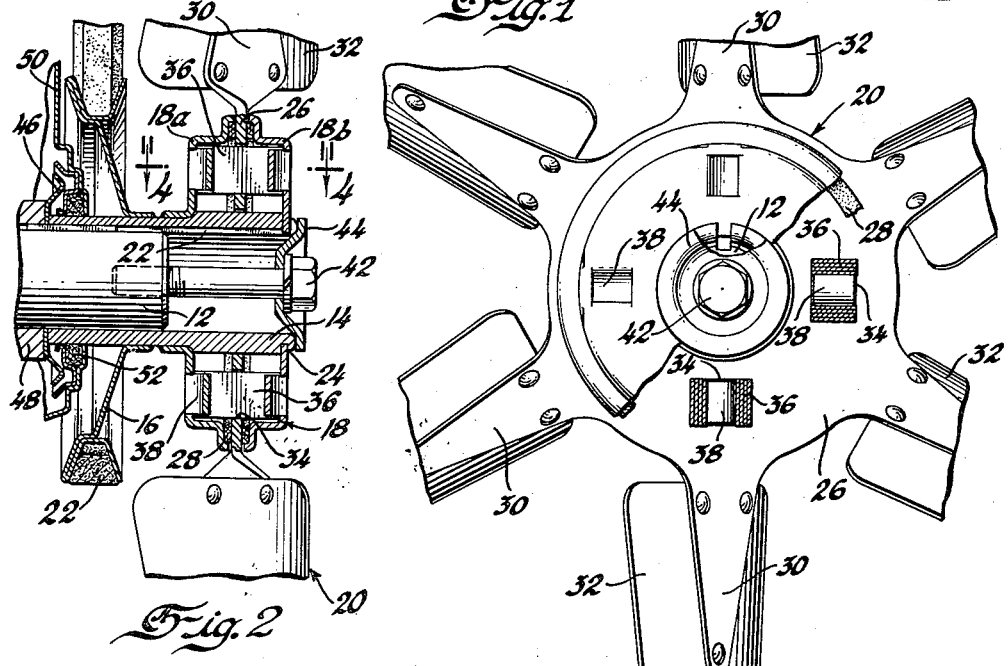
Fig. 2
Fig. 3
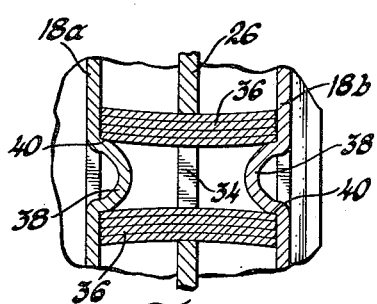
Fig. 4
Inventor
Arthur W. Gaubatz
By Blackmore, Spencer & Flint
Attorneys Patented July 9, 1940

2,207,376

UNITED STATES PATENT OFFICE 2,207,376

VIBRATION SUPPRESSOR

Arthur W. Gaubatz, Flint, Mich., assignor to General Motors Corporation, Detroit, Mich., a corporation of Delaware Application September 12, 1938, Serial No. 229,556

5 Claims. (Cl. 74—574)

This invention relates to vibration suppressing means for internal combustion engine or other shafts subject to torsional vibration.

The object is to improve harmonic vibration absorbers or balancers, facilitate production, reduce costs and broaden the utility of vibration absorbers of this type.

The invention consists of a combination comprising an inertia body of sheet or plate metal spring-connected to one end of an engine crankshaft by improved means, said body having a periodicity that adapts it to counteract the vibrations of the crankshaft when the engine is operating, as more particularly described hereinafter and illustrated in the accompanying drawing.

In said drawing Fig. 1 is a side elevation of an engine with parts broken away and in section to disclose the crankshaft and showing on the front end a composite vibration suppressor and cooling fan; Fig. 2 is an axial section through a sleeve keyed to the crankshaft and having mounted thereon a pulley and a combined vibration suppressor and cooling fan; Fig. 3 is a front elevation of the combined vibration suppressor and fan showing the spring housing partly broken away, and Fig. 4 is a sectional view on the line 4—4 of Fig. 2.

In Fig. 1 numeral 10 indicates an engine shown fragmentarily, a portion of the crankcase having been broken away to disclose the crankshaft 12, the front end of which extends forward through the engine casing. On the front end of the crankshaft forward of the engine casing there is keyed a sleeve 14 to which is securely fixed a pulley 16 and a two part spring-carrying and housing member 18. A fan 20 is spring connected to the member 18 and serves as the inertia body of the vibration balancer. The pulley 16 drives a belt 22 which transmits rotation to another pulley attached to the generator.

Referring now to Figs. 2, 3 and 4, it will be seen that the interior of sleeve 14 is grooved longitudinally at 22 to receive a key seated in a corresponding grove in the forward end of the crankshaft 12. Pulley 16 may be secured to sleeve 14 by welding or brazing. Forward of pulley 16 the spring-carrying and housing member 18 is attached rigidly to said sleeve 14. Member 18 consists of two parts 18a and 18b which may be shaped from sheet metal, the part 18a being, as shown, welded or brazed to sleeve 14 adjacent to the pulley 16 and the part 18b having a flange seated in a circumferential groove 24 in the forward end of said sleeve 14 and riveted in place by upsetting the end of the sleeve, or otherwise secured. The outer edges of the two parts 18a and 18b of the spring carrier or housing member 18 are separated far enough to receive a fan body or fan-blade carrier 26 having arms 30 radiating therefrom to which blades 32 may be secured as by rivets. A central opening in the fan body allows the latter to surround the sleeve 14 leaving slight clearance between the sleeve and the fan body as indicated in Fig. 2. Rings of cork or other suitable packing material are placed between the fan body 26 and spring-carrying and housing members 18a and 18b as indicated at 28 to avoid metallic contact between the inertia body 26 and the housing members 18a and 18b. When the two parts 18a and 18b are assembled they form an annular channel-like housing with parallel sides and spaced circumferential beads centrally disposed on the exterior periphery, the interior of the beads forming seats for said packing rings 28 which are spaced as stated for the reception of the fan body.

The fan body 26, shown as made from sheet or plate metal, is provided with a plurality of eccentrically disposed holes 34 equally spaced. In the construction shown there are four substantially rectangular holes 34 equiangularly spaced and through them are passed pairs of springbanks 36. Each spring-bank is composed of a plurality of oblong plate springs extending generally parallel with the crankshaft axis. The sides of the holes 34 in fan body 26 engage the mid portions of the spring banks as shown in Figs. 2 to 4 inclusive. The ends of the spring banks 36 bear against radially extending bosses 38 formed on the inner sides of the parts 18a and 18b of the spring carrying and housing member. These bosses are angularly spaced to correspond with the spacing of the holes 34 in the body 26. The arrangement of the springs with respect to the fan body is such that in the position of equilibrium the springs are stressed between side walls of the passages in the body and the abutments as shown clearly in detail Fig. 4. The bosses 38 form at their bases angles of approximately 90° with the inner sides of the parts 18a and 18b thereby providing seats or abutments 40 for the ends of the spring banks. Inward of the spring seats the sides of the bosses converge to a rounded ridge or apex.

The assembly of pulley, fan and spring housing is secured to the end of the crankshaft 12 so as to prevent any longitudinal movement by a bolt 42 and plate 44 which bears against the forward end of the sleeve 14. Screwing up the bolt pushes the sleeve 14 against the oil thrower 46 and the hub of timing gear 48.

A sheet metal housing 50 carries the oil packing 52 which serves to impede the flow of oil outward from within housing 50 to the pulley, balancer and fan assembly.

The sleeve 14, pulley 16, spring-carrier and housing 18 and the fan 20 are assembled as a unitary piece of mechanism which may be affixed as a unit on the end of a crankshaft.

In the construction disclosed herein the housing 18 rigidly secured to sleeve 14 partakes of all movements of the front end of the crankshaft. The fan body 26, arms 30 and fan blades 32 constitute an inertia body spring-connected to the housing 18 and tuned to counteract the vibrations of the engine shaft.

I claim:

1. In a vibration suppressor the combination of a spring carrier comprising spaced parallel annular members adapted to be secured to a shaft, opposite spring abutments on said members, an inertia body disposed between said members, said inertia body having passages therethrough and plate springs passing through said passages with their ends resting against said abutments, said inertia body being free to vibrate about its axis except as restrained by said springs and incidental friction.

2. A combination as defined in claim 1, in which the parallel annular members have said spring abutments projecting inward on their opposed faces.

3. A combination as defined in claim 1, in which two sets of spaced apart plate springs extend through each passage in the inertia body, the side walls of said passages stressing each set of springs.

4. The combination of a sleeve adapted to be secured upon a shaft, a two part annular spring carrier secured to said sleeve, an inertia body, the parts of said spring carrier having a space between them slightly wider than the thickness of the adjacent portion of the inertia body, packing rings between the inertia body and said parts, said parts having opposed spring abutments, and said inertia body having holes disposed between the opposed abutments, and banks of plate springs passing through said holes and having their end portions resting against the spring abutments.

5. In vibration absorbing mechanism, the combination of an annular two-part channel-shaped housing and means for securing it to a shaft, said housing consisting of axially spaced parallel sided and flanged sheet metal members facing one another, an inertia body of sheet metal disposed between said members, and projecting radially outward of the periphery of the housing, said inertia body having a central opening to permit the passage of the shaft and eccentrically disposed openings, opposed bosses on the respective housing members, each boss having a spring-seat on each side thereof, and pairs of plate springs passing through the eccentrically disposed openings in the inertia body with their ends engaging the seats on the bosses and their mid-portions in contact with opposite walls of the eccentrically disposed openings in the inertia body.

ARTHUR W. GAUBATZ.